United States Patent
Zhang

(10) Patent No.: US 8,485,217 B2
(45) Date of Patent: Jul. 16, 2013

(54) PLUG VALVE FOR GAS STOVE

(75) Inventor: Feng Zhang, Ningbo (CN)

(73) Assignee: Ningbo Wanan Co., Ltd., Ningbo (CN)

( * ) Notice: Subject to any disclaimer, the term of this patent is extended or adjusted under 35 U.S.C. 154(b) by 0 days.

(21) Appl. No.: 12/828,314

(22) Filed: Jul. 1, 2010

(65) Prior Publication Data

US 2012/0001110 A1    Jan. 5, 2012

(51) Int. Cl.
*F15B 13/00* (2006.01)

(52) U.S. Cl.
USPC ...... 137/271; 137/599.16; 137/607; 251/209; 126/52

(58) Field of Classification Search
USPC .............. 137/269, 271, 607, 599.17, 599.16, 137/267, 270; 251/218, 215, 286, 284, 91, 251/127, 205–209; 431/2, 12, 18, 61, 62, 431/65, 72, 354; 126/25 R, 39 E, 39 R, 39 N, 126/52; 16/441
IPC ................. F23N 3/02,1/00, 14/00, 14/02, 14/04
See application file for complete search history.

(56) References Cited

U.S. PATENT DOCUMENTS

| | | | | |
|---|---|---|---|---|
| 2,525,928 A * | 10/1950 | McRae | ......................... | 251/218 |
| 2,763,289 A * | 9/1956 | Mueller | ................... | 137/599.17 |
| 2,987,078 A * | 6/1961 | Du Perow | ................ | 137/599.17 |
| 5,509,403 A * | 4/1996 | Kahlke et al. | ............... | 126/39 E |
| 5,983,884 A * | 11/1999 | Lee | ............... | 126/39 R |
| 6,880,571 B2 * | 4/2005 | Lin | ......................... | 137/599.17 |
| 7,458,386 B2 * | 12/2008 | Zhang | ......................... | 137/15.18 |
| 2006/0175566 A1 * | 8/2006 | Albizuri | ......................... | 251/207 |

* cited by examiner

Primary Examiner — John K Fristoe, Jr.
Assistant Examiner — Time Algbe
(74) Attorney, Agent, or Firm — Matthias Scholl P.C.; Matthias Scholl

(57) ABSTRACT

A plug valve for a gas stove, consisting at least of a natural-gas nozzle, a propane-gas nozzle, a valve body, a cock, an adjusting rod, an O-shaped ring, a stop ring, a spring, a stop plate, a cover, a pair of screws, and a valve rod. The adjusting rod, the O-shaped ring, and the stop ring are disposed in the cock, the cock, the spring, the stop plate, the cover, and the valve rod are disposed in the valve body via the screws, the natural-gas nozzle or the propane-gas nozzle is disposed in the valve body. Switching between natural gas and propane gas, flow adjustment thereof are convenient, and no special tool is required, which make the invention suitable for a wide range of users. The plug of he invention is safe and reliable.

9 Claims, 4 Drawing Sheets

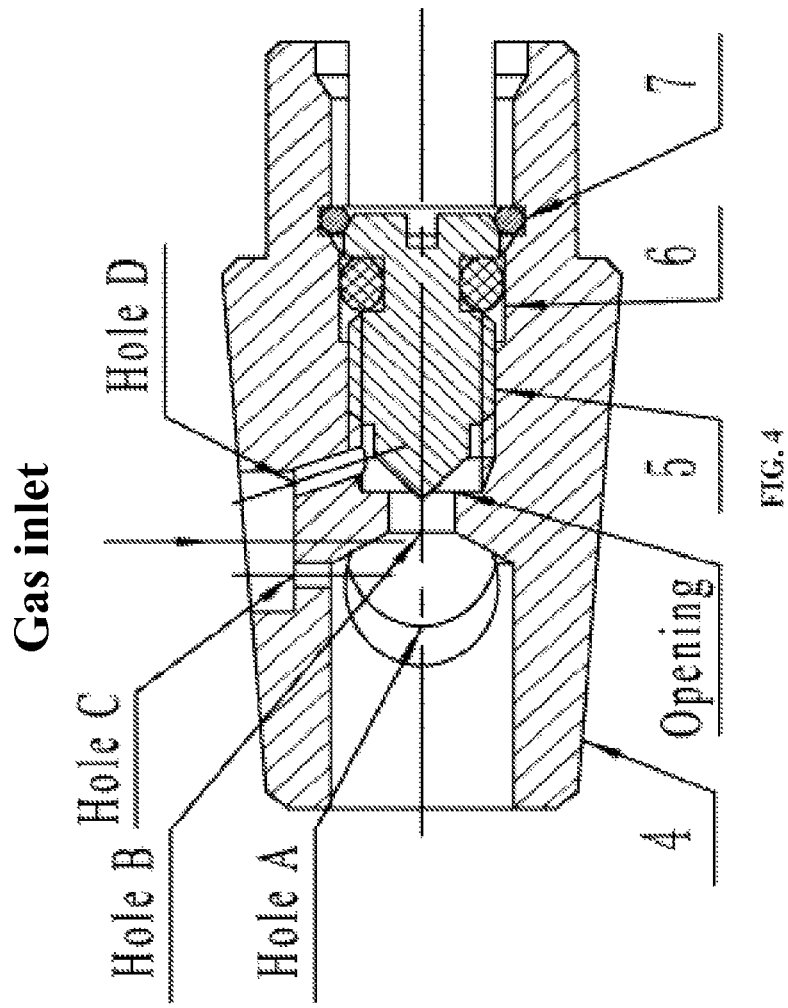

PLUG VALVE FOR GAS STOVE

BACKGROUND OF THE INVENTION

1. Field of the Invention

The invention relates to a plug valve, and more particularly to a plug valve for a gas stove that operates with propane gas and/or natural gas.

2. Description of the Related Art

Plug valves for natural gas and propane gas are widely used nowadays. However, there are several problems with the conventional plug valves: firstly, flow of natural gas and propane gas cannot be adjusted conveniently; secondly, production cost thereof is high and materials are wasted; and finally, operation thereof is inconvenient.

SUMMARY OF THE INVENTION

In view of the above-described problem, it is one objective of the invention to provide a plug valve for a gas stove that is capable of addressing the above-mentioned problems.

To achieve the above objectives, in accordance with one embodiment of the invention, provided is a plug valve for a gas stove, comprising a natural-gas nozzle, a propane-gas nozzle, a valve body, a cock, an adjusting rod, an O-shaped ring, a stop ring, a spring, a stop plate, a cover, a pair of screws, and a valve rod. The adjusting rod, the O-shaped ring, and the stop ring are disposed in the cock, the cock, the spring, the stop plate, the cover, and the valve rod are disposed in the valve body via the screws, the natural-gas nozzle or the propane-gas nozzle is disposed in the valve body.

In a class of this embodiment, the cock is screw fit with the adjusting rod.

In a class of this embodiment, displacement of the adjusting rod with respect to the cock is axially fixed and limited by the stop ring.

In a class of this embodiment, a first slot is disposed on the cock and operates to fix the stop ring.

In a class of this embodiment, the natural-gas nozzle is used when gas is natural gas.

In a class of this embodiment, flow variation of natural gas is implemented by turning the valve rod.

In a class of this embodiment, the propane-gas nozzle is used when the gas is propane gas.

In a class of this embodiment, flow variation of propane gas is implemented by turning the valve rod.

In a class of this embodiment, the cock and the adjusting rod are radially fixed via the O-shaped ring.

In a class of this embodiment, a second slot is disposed on the adjusting rod and operate to fix the O-shape ring.

Advantages of the Invention Comprise 1) switching between natural gas and propane gas, flow adjustment thereof are convenient, and no special tool is required, which make the invention suitable for a wide range of users; and
2) the invention is safe and reliable.

BRIEF DESCRIPTION OF THE DRAWINGS

Detailed description will be given below in conjunction with accompanying drawings, in which:

FIG. 4 illustrates an opening state of a cock of the invention.

DETAILED DESCRIPTION OF THE EMBODIMENTS

Figure 1:
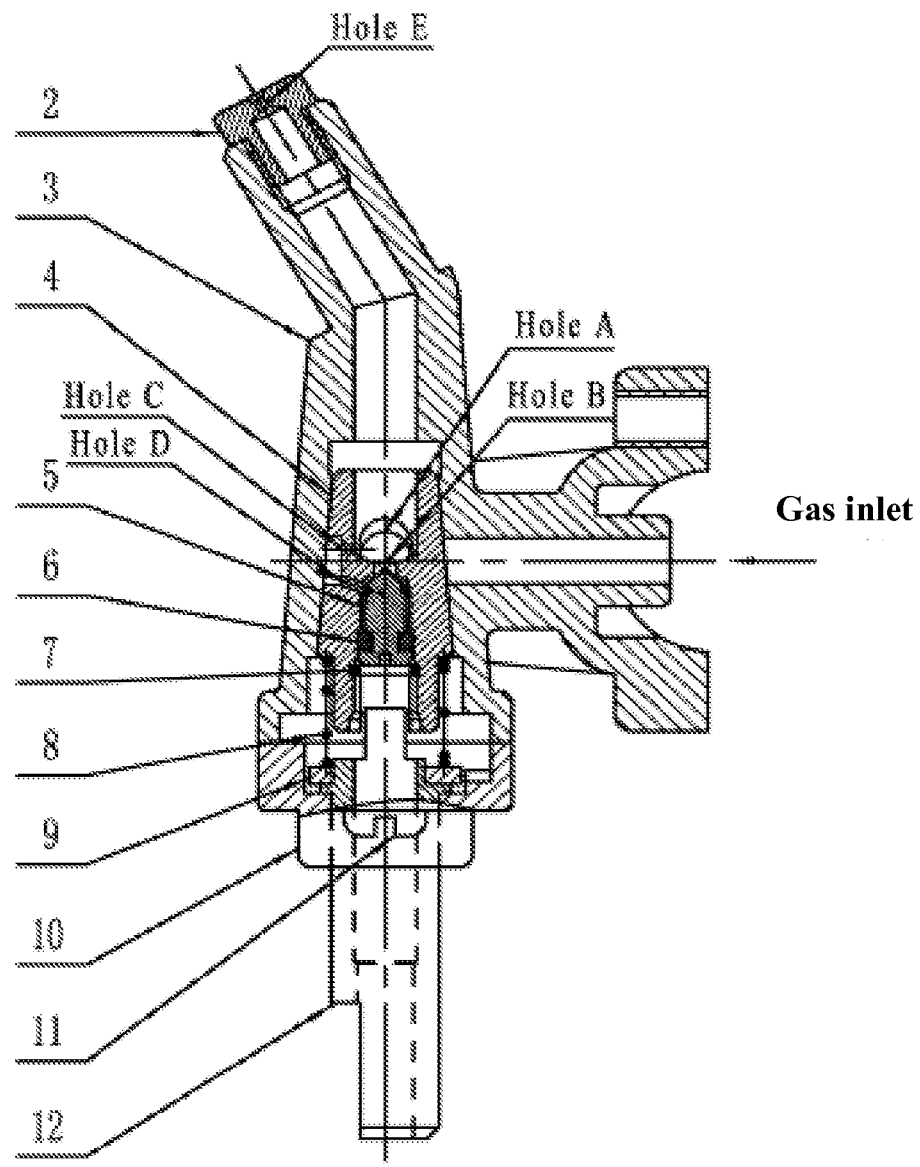
FIG. 1 is a cross-sectional view of a plug valve for a gas stove of an exemplary embodiment of the invention.
Figure 2:
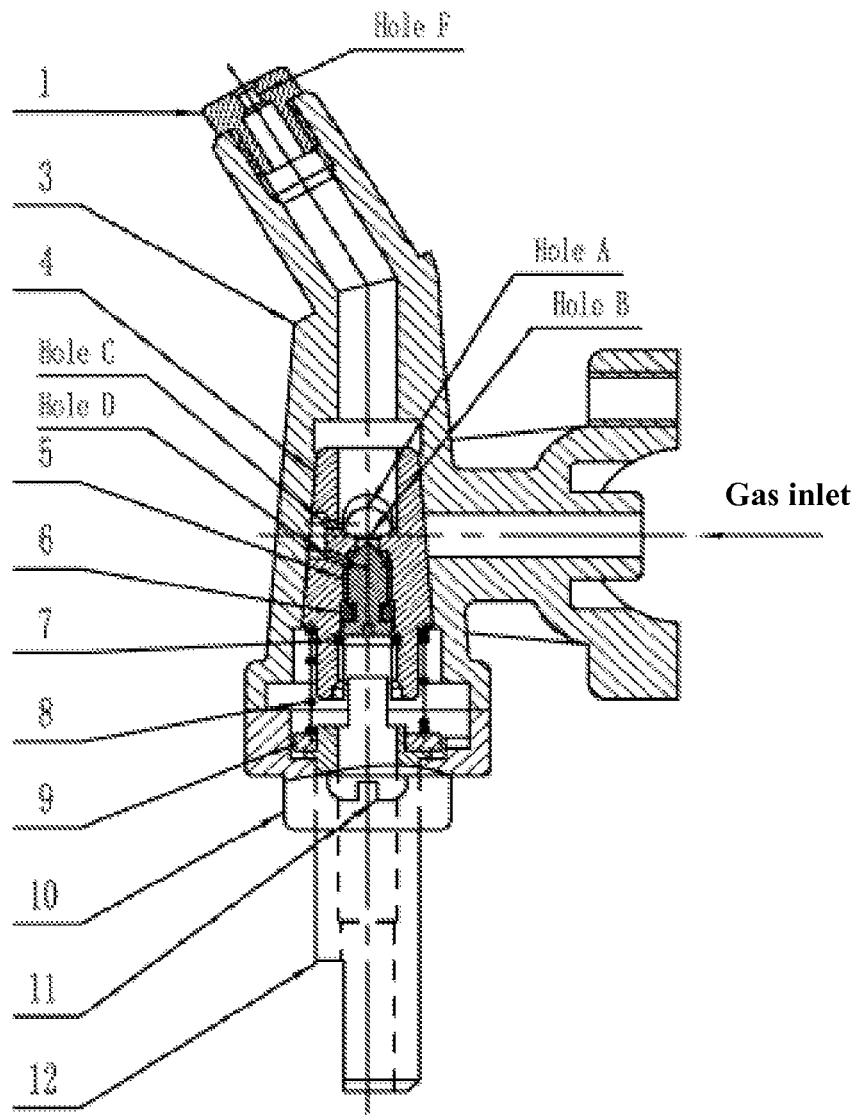
FIG. 2 is another cross-sectional view of a plug valve for a gas stove of an exemplary embodiment of the invention.

As shown in FIGS. 1 and 2, a plug valve for a gas stove of the invention comprises a natural-gas nozzle 1, a propane-gas nozzle 2, a valve body 3, a cock 4, an adjusting rod 5, an O-shaped ring 6, a stop ring 7, a spring 8, a stop plate 9, a cover 10, a pair of screws 11, and a valve rod 12.

The adjusting rod 5, the O-shaped ring 6, and the stop ring 7 are disposed in the cock 4.

The cock 4, the spring 8, the stop plate 9, the cover 10, and the valve rod 12 are disposed in the valve body 3 via the screws 11, and the natural-gas nozzle 1 or the propane-gas nozzle 2 is disposed in the valve body 3.

The cock 4 is screw fit with the adjusting rod 5, and displacement of the adjusting rod 5 with respect to the cock 4 is limited by the stop ring 7.

A first slot is disposed on the cock 4 and operates to fix the stop ring 7 (not shown).

The natural-gas nozzle 1 is used when the gas is natural gas, and flow variation of natural gas is implemented by turning the valve rod.

The propane-gas nozzle 2 is used when the gas is propane gas, and flow variation of propane gas is implemented by turning the valve rod.

The cock 4 and the adjusting rod 5 are radially fixed via the O-shaped ring 6.

A second slot is disposed on the adjusting rod 5 (not shown) and operates to fix the O-shape ring 6.

A nozzle hole of the natural-gas nozzle 1 is larger than that of the propane-gas nozzle 2.

As shown in FIG. 4, as natural gas is used, at low setting the adjusting rod 5 is turned via a screw driver so that it is in an opening state. At this time holes B and D are connected with each other whereby increasing low-level flow of natural gas. At high setting, the propane-gas nozzle 2 is replaced by the natural-gas nozzle 1 whereby increasing high-level flow of natural gas.

Figure 3:
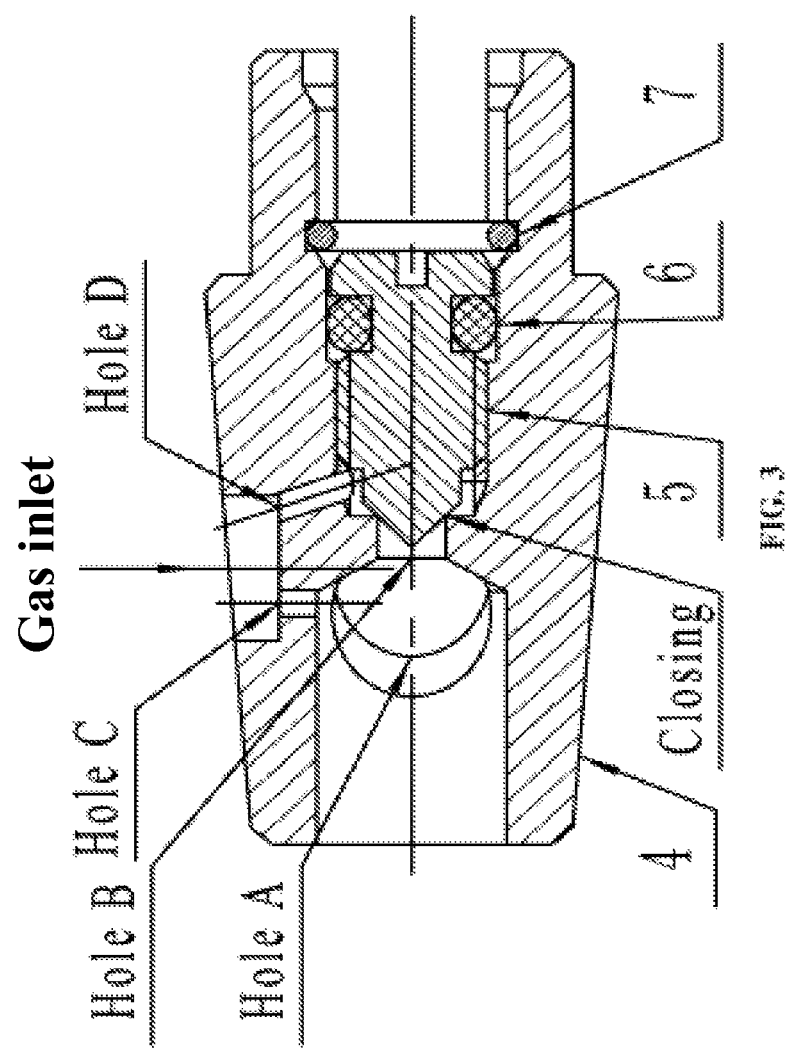
FIG. 3 illustrates a closed state of a cock of the invention.

As shown in FIG. 3, as propane gas is used, the adjusting rod 5 is turned via a screw driver so that it is in a closed state. At this time the natural-gas nozzle 1 is replaced by the propane-gas nozzle 2. The adjusting process is very convenient and reliable.

The operation principle and the flow direction of the plug of the invention are as follows:

When propane gas is used, the valve rod 12 is turned and drives the cock 4 to rotate for 90 degrees in a counterclockwise direction to reach a high-level position. At this time, propane gas enters via an air inlet and a hole A, and is discharged via a hole E of the propane-gas nozzle 2. If the cock 4 continues to rotate for 90 to 180 degrees, a low-level position is reached. At this time, propane gas enters via the air inlet, and is discharged via holes C to E.

When natural gas is used, the valve rod 12 is turned and drives the cock 4 to rotate for 90 degrees in a counterclockwise direction to reach a high-level position. At this time, natural gas enters via an air inlet and a hole A, and is discharged via a hole F of the natural-gas nozzle 1. If the cock 4 continues to rotate for 90 to 180 degrees, a low-level position is reached. At this time, natural gas enters via the air inlet, and is discharged via holes C and D (or B) to F.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A plug valve for a gas stove, said plug valve comprising—a natural-gas nozzle having an orifice (F); a propane-gas nozzle having an orifice (E); a valve body comprising a first side wall having a first inner surface confining an interior space; a first outer surface; and a gas inlet formed through said first outer surface and said first inner surface; said interior space comprising a cock mounting portion having an axis, and an outlet passage having a gas outlet; said cock mounting portion being connected with said outlet passage; and said gas inlet being connected with said cock mounting portion; a cock comprising a second side wall having a second inner surface confining a cock space; a second outer surface formed with a gas slot; an orifice (C) connecting through said cock space and said gas slot; and an orifice (D) connecting through said cock space and said gas slot; said second inner surface being formed with a radial inward annular seat which defines an opening (B) registering with said axis; and said seat dividing said cock space into a stable feed portion and an adjustable feed portion; an adjusting rod having a conical top; an O-shaped ring; a stop ring; a spring; a stop plate; a cover; a pair of-screws; and a valve rod; wherein: said adjusting rod, said O-shaped ring, and said stop ring are disposed in said adjustable feed portion; said cock, said spring, said stop plate, said cover, and said valve rod are disposed in said cock mounting portion via said screws, whereby said cock and said valve rod are co-rotatably fixed and are rotatable around said axis, and rotation of said cock around said axis is driven by turning said valve rod; said natural-gas nozzle or said propane-gas nozzle is disposed in said gas outlet for discharging gas; said second outer surface is in sliding contact with said first inner surface; said gas inlet is adapted to lead gas from outside of the plug valve into the plug valve; said orifice (C) connects with said stable feed portion, and said orifice (D) connects with said adjustable feed portion are; said opening (B) connects said stable feed portion with said adjustable feed portion; said stable feed portion is connected with said outlet passage; when the gas valve is used for natural gas, said natural-gas nozzle is connected with said gas outlet, and said orifice (F) is connected with said outlet passage; when the gas valve is used for propane gas, said propane-gas nozzle is connected with said gas outlet, and said orifice (E) is connected with said outlet passage; said adjusting rod is disposed within said cock and said adjusting rod is screw fit with said cock, whereby when said cock is rotated, said adjusting rod has an axial movement with respect to said cock, said axial movement of said adjusting rod with respect to said cock determining a cross sectional area of said opening (B) which is used for passing through gas from said adjustable portion to said stable portion; when utilizing the plug valve, said valve rod together with said cock is turned, whereby said gas slot and said gas inlet are connected, gas is led from said gas inlet through said gas slot into the plug valve, and gas having a stable flow is transferred through said orifice (C) to said outlet passage; and when said gas slot and said gas inlet are connected and when said valve rod together with said cock is further turned, said axial movement of said adjusting rod with respect to said cock is changed, and said cross sectional area of said opening (B) is changed, whereby gas having an adjustable flow is transferred through said orifice (D) to said opening (B), and then to said outlet passage.

2. The plug valve of claim 1, wherein displacement of said adjusting rod with respect to said cock is axially fixed and limited by said stop ring.

3. The plug valve of claim 2, wherein a first slot is disposed on said cock and operates to fix said stop ring.

4. The plug valve of claim 1, wherein said natural-gas nozzle is used when the gas is natural gas.

5. The plug valve of claim 4, wherein flow variation of said natural gas is implemented by turning said valve rod.

6. The plug valve of claim 1, wherein said propane-gas nozzle is used when the gas is propane gas.

7. The plug valve of claim 6, wherein flow variation of said propane gas is implemented by turning said valve rod.

8. The plug valve of claim 1, wherein said cock and said adjusting rod are radially fixed via said O-shaped ring.

9. The plug valve of claim 8, wherein a second slot is disposed on said adjusting rod and operates to fix said O-shape ring.

* * * * *